United States Patent Office 3,423,337
Patented Jan. 21, 1969

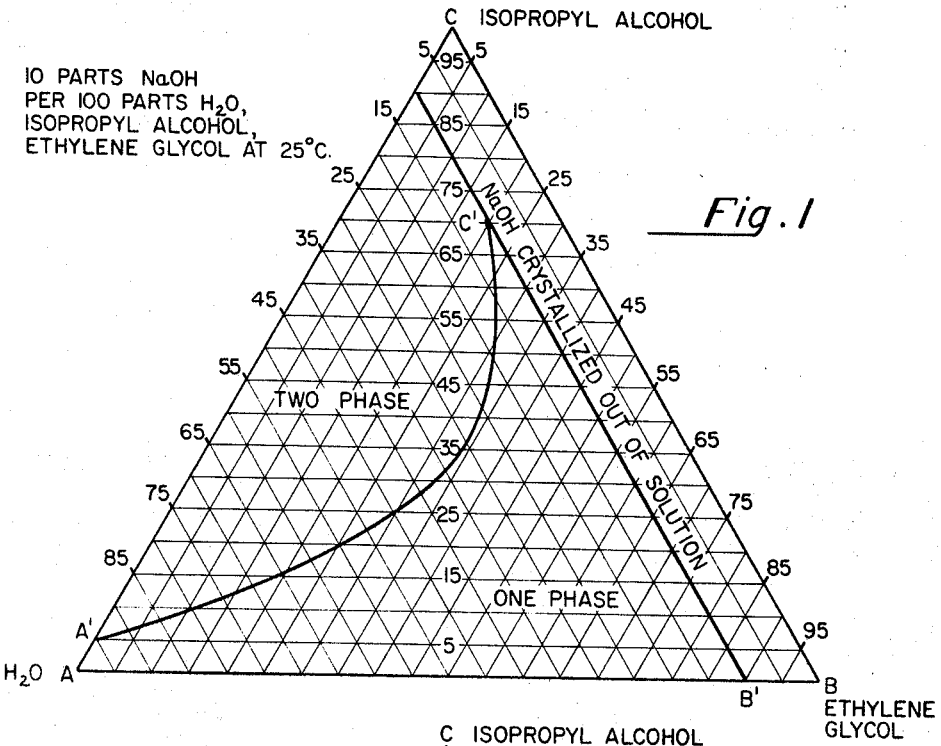
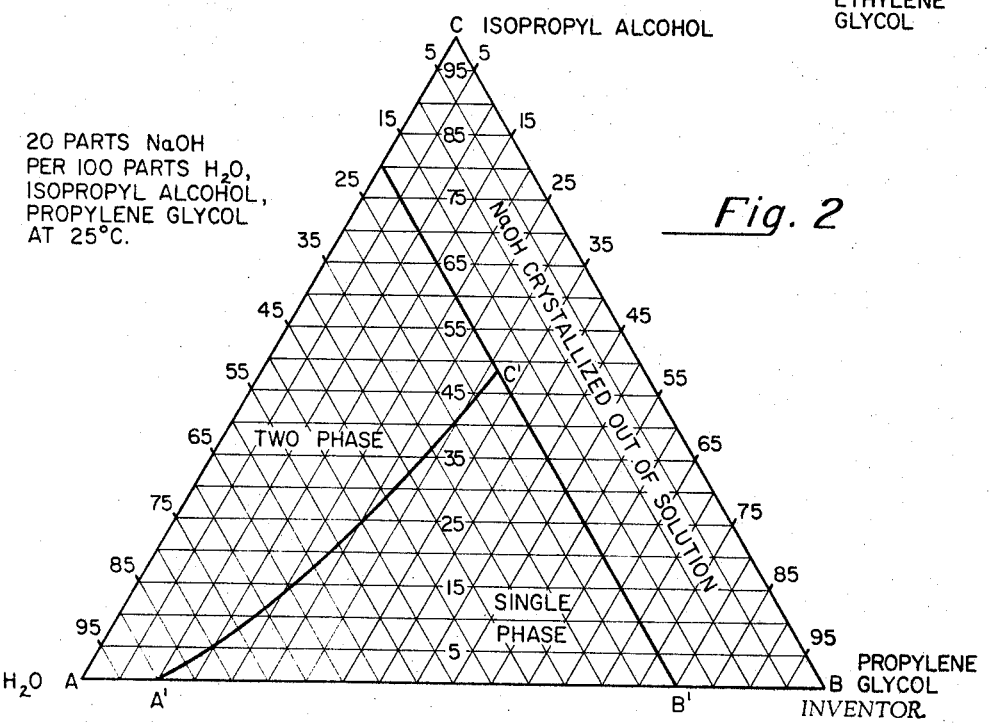
INVENTOR.
ROBERT G. SUTTON

3,423,337
LIQUID RETICULATION OF POLYURETHANE FOAMS
Robert G. Sutton, Philadelphia, Pa., assignor to Scott Paper Company, Philadelphia, Pa., a corporation of Pennsylvania
Filed Apr. 30, 1965, Ser. No. 452,198
U.S. Cl. 260—2.5                    10 Claims
Int. Cl. C08g 22/44

ABSTRACT OF THE DISCLOSURE

Process for reticulating polyurethane foam at a temperature below 50° C., by immersing a foam body in an aqueous solution of an alkaline hydroxide, a water-soluble glycol, and an aliphatic alcohol.

---

This invention pertains to reticulation of polyurethane foams; more specifically, this invention involves the use of liquids for reticulating polyurethanes such as polyester polyurethanes, polyether polyurethanes, polyether-amine polyurethanes, etc.

Prior art methods for reticulating polyurethane foams can be divided into two groups. First, flame techniques have been used to obtain a reticulated skeletonized polyurethane foam. Examples of such methods are explosion reticulation and burning reticulation or melting reticulation. Second, catalyzed hydrolytic action on polyurethane foams has been used to produce reticulated polyester polyurethane structures, and, to a lesser degree, polyether and polyether-amine urethane structures.

By far, the most popular hydrolytic reticulation has been effected by using sodium hydroxide-catalyzed water solutions on the polyester polyurethanes at about 10% sodium hydroxide concentration and at about 50° C. and higher.

Various attempts have been made to accelerate this hydrolytic action and these attempts have resulted in some improvements—generally, improvement in the reaction rate.

Despite the improved reaction rate these processes have presented different and added problems in liquid reticulation. One has been the introduction of high-vapor-pressure solvents into the solution. For example, British Patent 858,127, Example 3, shows the use of acetone as an aid in sodium hydroxide-catalyzed hydrolytic reticulation. Additionally, other processes have been disclosed in the patent literature showing the use of monohydroxy glycol ethers as additives in alkaline solution-catalyzed hydrolytic reticulation.

Still other processes have illustrated additives such as alcohols in alkaline-catalyzed hydrolytic reticulation. In the last method, apparently, the alleged alkaline solutions are not true solutions with alcohols having more than two carbon atoms, i.e., methanol and ethanol. It has been found that propanol separates out of the alkaline solution at the needed concentrations, and the catalyzed reaction is due to the alkaline solution with the propanol aiding perhaps only the contacting of foam with the sodium hydroxide solution. Therefore, true solutions are exceptions in liquid reticulation and are only found in certain very limited instances with methanol and ethanol and then only at very limited conditions of alkaline concentrations.

Another approach in the catalyzed aqueous reticulation of polyurethane has involved the use of halogen-substituted hydrocarbons in a mixture with alcohols and/or phenols. This method, again, has been restricted to methanols and ethanols and has, in very few limited instances, resulted in a true solution. In those cases where these solutions have separated into alcohol and aqueous phases the reticulation has been the result of the aqueous alkaline solution.

In another method of liquid reticulation based an alkali reticulation anhydrous methyl alcohol and anhydrous alcohols such as methyl-ethyl mixture, ethyl, propyl and butyl are other suggested species. Although in this method the anhydrous alcohol is a starting material no mention has been made of the concentration of the sodium hydroxide or the other constituents, and it can be inferred that this is not a truly anhydrous solution because neither solid sodium hydroxide nor solid potassium hydroxide has been employed.

It has now unexpectedly been found that a superior combination of reactants can reticulate polyurethane foams at high reaction rates under controlled conditions in a true solution avoiding most of the problems of the higher vapor-pressure additives employed in the prior art.

The present invention has been achieved by permeating a polyurethane foam body with a reticulating solution comprised of (a) alkali hydroxides such as sodium and potassium hydroxides, (b) an aliphatic alcohol, (c) water and (d) a glycol for a time sufficient to achieve reticulation and thereafter arresting the reaction by removing the reticulating solution from the polyurethane body or neutralizing and washing the polyurethane body. In this combination of components glycol appears to give the unexpected rate of reaction, but more importantly, it allows the use of heretofore unachieved amounts of caustic material. The resulting product has a glossy surface appearance and resembles explosion-reticulated polyurethane foam. Thus, the product of this invention and the product of the explosion process are very similar in all respects. Weight losses of foams reticulated according to the novel method are about half of the weight losses encountered with hydrolitically reticulated foams such as in the method disclosed in U.S. Patent 3,171,820.

Properties of the obtained foam are somewhat closer to the explosion-reticulated foam than to the liquid alkaline-reticulated foam. However, the differences between each of these are slight and within the range of experimental error, and therefore, for all practical purposes these three types of foam are alike.

At this point it should be cautioned that permeatoidal degradation of foams of this invention may be prevalent if the reticulation conditions are not carefully controlled. Therefore, in order to avoid the phenomenon of permeatoidal degradation, the time of exposure of foam to the above solution, the temperature of the solution, and the relative proportions of the various components must be controlled to obtain optimum results.

Generally, it has been found that temperatures below 45° C. are preferred. The lower temperature limit is the freezing point and/or phase separation which occurs near the freezing temperatures. The more preferred temperatures are below 40° C. and are based on vapor pressure considerations or safety factors such as hot caustic handling including heating and corrosion. The most preferred temperatures are at about 35° C.

Because the reaction rate will double for every 10° C., correct temperature is very important and should be held as constant as possible. However, in reticulating polyurethane foams with large pores, e.g., 5 p.p.i. foams (pores per lineal inch), high temperatures and longer immersion times are needed such as about 5 minutes at about 45° C. for the 5 p.p.i. foam. It has also been found that with highly cross-linked polyurethane foams the reaction is slower. At the other end of the foam spectrum, for example, at about 125 pores per lineal inch and higher pore counts, the immersion times are very short and the temperatures are considerably lower, such as 35° C. and below.

To further illustrate the various relationships the following figures have been included wherein:

FIGURE 1 shows a ternary diagram of water, ethylene glycol and isopropyl alcohol with sodium hydroxide comprising 10 parts per 100 parts of the three components and the whole solution at 25° C. The area A', B' and C' and A represents the one-phase region of the solution giving uniform properties when polyurethane foams such as polyester polyurethane foams are subjected with this solution to reticulated conditions.

FIGURE 2 is a ternary diagram showing water, isopropyl alcohol and propylene glycol at 25° C. and at sodium hydroxide concentration of 20 parts per 100 parts of the solution.

Polyurethane foams suitable for reticulation are well known in the art and the listing of the many ester, ether, polyether amine etc. foams would only be repetition of the by now well-known foams. A number of suitable foams are mentioned in U.S. Patent 3,171,820. The polyester foams are preferred over others.

In general, all aliphatic alcohols useful in this process have 3 or more carbon atoms as embraced within the above term. The preferred alcohols are aliphatic alcohols which are liquids at room temperature. The more preferred alcohols start with propyl alcohol up to deconal. However, for economical reasons the commercially available lower alcohols are the most preferred group starting with propyl alcohol up to hexyl alcohol. Representative alcohols of the above groups are propyl alcohols, butyl alcohols, hexyl, heptyl, octyl, nonyl and deca alcohols and isomers and mixture of isomers and other alcohols thereof.

Glycols useful in the present reaction are generally those that are soluble in at least 10% aqueous caustic solutions at room temperature. Because the higher alcohols used are otherwise insoluble in aqueous caustic solutions the quantity of glycol added and its water-soluble properties are dependent upon the type of alcohol applied. For example, butyl alcohol requires more ethylene glycol than isopropyl alcohol. Also, as the quantity of sodium hydroxide of the alkaline material is increased more ethylene glycol is required to keep the alcohol in solution. Again, unexpectedly, it has been found that propyl glycol tolerates greater amounts of caustic than ethylene glycol. As the temperature is increased the quantity of glycol required is also decreased. It is noted that with ethylene glycol when water is reduced to less than 10 parts of the total solution or lower, the hydroxide crystallizes out of the solution.

Of the glycols employed, those having from two to four carbon atoms are the most preferred, such as ethylene glycol and propylene and their water-soluble condensation products. The propylene glycol is most preferred. Because it is well known that glycols become less water-soluble with increase in molecular weight as well as increase in condensation, careful selection of the water soluble glycols is required. In addition, when the influence of alcohol on this water glycol mixture is taken into consideration, it is evident that only a very specific relationship exists which allows proper reticulation of polyurethane foams.

By far the most common alkali agents useful in the present process are sodium hydroxide and potassium hydroxide. Other alkali materials such as the alkaline earth metal hydroxides are less dependable because of their poor solubility.

Although the discussion has been of hydrolytic action, it is not known by what process the polyurethane reticulation reaction takes place. It is believed, however, that there is an inter-action of stress and an accelerated high-rate chemical reaction. This assumption or surmise is based on the fact that the membranes removed from the polyurethane foam in the reticulation process fall out but do not appear to dissolve in the solution and even after three months the components are present in virtually the same disintegrated form.

It is believed that the membranes of polyurethane foam swell much more rapidly and that this difference in swelling places greater stress around the edges of the membranes resulting in reticulation reaction. Comparatively speaking, the strands are essentially non-swelling at the preferred reaction conditions. However, the foam does disintegrate in its component parts in a relatively short time, e.g., about 5 minutes for 45 p.p.i. polyester polyurethane foams at 35° C. in a 10% sodium hydroxide-isopropyl alcohol-ethylene glycol solution.

The starting foam falls into nexus, strands attached to nexus and membranes. Relatively very few individual strands are found in the solution. It is believed that if the reaction were not stress-induced and stress-accelerated a great number of strands would be found in the solution because the stress-independent strands would be assumed to disintegrate at places joined to the nexus. Because of the stress acceleration reaction the nexus and strands are joined together in these assemblies and therefore, as mentioned before, the disintegrated foam components stay suspended in the reticulating solution for a long period of time without any further substantial attack.

More surprisingly, in the present solutions, acids such as hydrochloric, sulphuric, etc., when used in place of caustic, result in no reaction. Moreover, not all of the expected polyurethane swelling solvents work in the present solution when replacing either the alcohol or glycol component. For example, the following chemicals were also evaluated in aqueous sodium hydroxide solution and the polyurethane foam was improperly reticulated due to immiscibility and/or very poor results: chlorinated solvents (immiscible) ether (immiscible), ketones (immiscible), hydroquinones (no results), dimethyl acetamide (requires high temperatures and long reaction time), dimethyl formamide (high temperatures, poor reticulation), dimethyl sulfoxide (high temperatuers, poor reticulation).

As mentioned before, one unique advantage of this process is that the foam is not discolored or matte-like. In fact, the product has the glossy appearance of an explosion-reticulated foam. Generally, the strands remain very glossy and the color is enhanced.

The following examplse are included to illustrate but not to limit the invention.

Example 1

Reticulation process was carried out using 10 parts of sodium hydroxide per 100 parts of the novel solution for various times and at various temperatures. The following solution was found to be very suitable at lower temperatures: isopropyl alcohol, 15%; water, 65%; ethylene glycol, 20%; sodium hydroxide, 10 parts per 100 parts of the solution.

The polyester foam reticulated in the above solution was prepared by a conventional one-shot foaming process using 80/20 isomeric mixture of 2–4, 2–6 toluene diisocyanate and "Fomrez 50," an adipate polyester, which is reported to have a hydroxyl number of 51.8, an acid number of less than 1.0 and a viscosity of 18,100 centipoises at 250° C. After curing, blocks were cut from the loaf and subjected to the above solution at 35° C. for 15, 30 and 60 seconds, and the reaction arrested by neutralization of the alkali with dilute acid and/or washing. 80-pore p.p.i. foam gave fair results at 15 seconds, good results at 30 seconds, excellent results at 60 seconds. 60 p.p.i. foam gave poor results at 15 seconds, fair results at 30 seconds and excellent results at 60 seconds. 10 p.p.i. foam gave no results at 15 seconds, no results at 30 seconds and good results at 60 seconds. Generally, these runs represent the better low temperature conditions.

A number of tests were conducted using the described foam and the solutions illustrated on the ternary diagram. Solutions in the one-phase region gave suitable results.

Example 2

The same solution as used in Example 1 was used on the same foam at 40° C. The following results were obtained.

NOVEL RETICULATING SOLUTION AT 40° C.

| Polyester polyurethane foam, p.p.i. | Reticulating results at different immersion times | | |
|---|---|---|---|
| | 15 seconds | 30 seconds | 60 seconds |
| 80 | Fair | Good to over reticulated. | Over reticulated. |
| 60 | Poor | Fair-good | Good to over reticulated. |
| 10 | Slight | Fair | Good. |

Results classified as poor indicate that no apparent reticulation is evident but some windows have started to break.

Results classified as slight indicate that the foam is just beginning to reticulate; some membranes are broken, some are still attached to the strands, and some are still unaffected.

Results classified as fair indicate that most of the membrane windows are removed but about 10% or more are present or attached to the strands.

Results classified as good indicate that there is a little edge attachment of remaining membranes on the periphery of the strands but substantially all membranes are gone and the foam retains the glossy appearance of the explosion reticulated foams.

Results classified as over reticulated indicate the foams have the following appearance: the gloss present in a "good" foam is gone, i.e., foam becomes softer when compared to a properly reticulated sample.

In practicing the invention it is often advantageous to work the foam structure slightly such as by compressing and relaxing it to expel the entrapped air and bring the solution in contact with the membranous matter. Solutions in the one-phase region give suitable results if the time factor is carefully controlled. As can be envisioned, operating at 40° C. with solvent such as isopropyl alcohol is immeasurably safer than with methanol, ethanol, or acetone.

Example 3

The same solution as used in Example 1 was used on an ether foam at 30° C., prepared from 40 parts of polyol 4025 which is a 4000 molecular weight diol derived from polypropylene oxide; 60 parts of LHT-42 which is a 4000 molecular weight triol derived from polypropylene oxide, 26.2 parts of toluene diisocyanate per 100 parts of the polyol; 1.9 parts of water per 100 parts of the polyol mixture, 0.3 part of Dabco per hundred parts of the polyol mixture (Dabco is a triethylene diamine), 0.1 part of triethylamine per hundred parts of the polyol mixture, 0.3 part of D-22 per hundred parts of the polyol mixture (D-22 is a dibutyl tin dilaurate). These materials were mixed using standard urethane production procedures in a high-pressure polyurethane foam-making machine. The foam mixture was allowed to free blow (under atmospheric conditions) and cured for at least 24 hours before handling. When compared with the results obtained with ester foams of Example 1, the ether foams are not as satisfactory as the ester foams.

Example 4

Foams of the same formulation as in Example 1 were reticulated by the following two methods. First, a 10% solution of sodium hydroxide of 10 parts per 100 parts solution of 15% isopropyl alcohol; 20% ethylene glycol and 65% water at 40° C. was employed to reticulate the above described ester foam. Second, a 20% solution of sodium hydroxide of 20 parts per 100 parts solution of 20% propylene glycol; 15% isopropyl alcohol and 65% water, at 40° C. and 30° C. respectively, was employed to reticulate the same foam. Results of the three reticulation times were as follows:

RETICULATION RESULTS AT DIFFERENT IMMERSION TIMES AND TEMPERATURES

| Polyester foam | 15 seconds | | 30 seconds | | 60 seconds | |
|---|---|---|---|---|---|---|
| | Solution 1 | Solution 2 | Solution 1 | Solution 2 | Solution 1 | Solution 2 |
| 80 p.p.i. at 40° C | Fair | Good | Good-Over | Over | Over | Over. |
| 80 p.p.i. at 30° C | | Poor | | Good | | Do. |
| 60 p.p.i. at 40° C | Poor | Good | Fair-Good | Over | Good-Over | Over. |
| 60 p.p.i. at 30° C | | Poor | | Good | | Good-Over. |
| 10 p.p.i. at 40° C | Slight | Fair | Fair | Good | Good | Over. |
| 10 p.p.i. at 30° C | | Poor | | Fair | | Good. |

NOTE.—Solution 1 was not run at 30° C.

From the above it is amply evident that the novel solution offers vastly faster reaction rates so essential for modern day high velocity processing techniques. Moreover, choice of reactants affords many safety factors in operating at different temperatures.

Example 5

Instead of the regular free blown polyurethane foam obtained by allowing free expansion, compressed polyurethane foams containing membranes were recticulated by means of the above solutions. A polyester polyurethane foam of about 45 p.p.i. of a thickness of ⅓ of its normal free blown thickness obtained by compressing unreticulated foam (or alternatively by compressing blown green foam) was immersed in solutions illustrated in Example 4. The immersed product was kept in the solution for a sufficient time to effect rectication. Upon removal from the solution and arresting of the reticulating reaction the foam was examined and observed to have substantially all of the windows removed. However, it was noticed that many of the removed windows (membranous matter) were still distributed loosely in the foam body. This example demonstrates that this method is superior to some of the prior art methods which appear not to be able to effect satisfactory reticulation of densified polyurethane foams.

Foams obtained according to the novel method were tested by ASTM Method D1564 for compression/deflection, tear resistance, tensile strength, elongation, compression set, aging resistance and solvent resistance tests and compared favorably with the same polyurethane foams reticulated by explosive means and sodium hydroxide hydrolytic reticulation.

What is claimed is:

1. In the alkali-catalyzed method for reticulating polyurethane foams to obtain 3-dimensional reticulated structures of nexus and strands joined to said nexus and substantially free from membranous matter, the improvement comprising immersing a membrane-containing polyurethane foam body in a substantially true solution causing reticulating reaction and held at below 50° C., said solution being comprised of water, an alkaline hydroxide, a water-soluble glycol, and an aliphatic alcohol having in excess of three carbon atoms, said foam residing in said solution until reticulation has been effected, separating said foam body from said solution and arresting the reticulating reaction.

2. In the alkali-catalyzed hydrolytic method for reticulating polyurethane foams to obtain a 3-dimensional reticulated structure consisting of spaced-apart nexus and strands joined to said nexus and substantially free from membranous matter, the improvement comprising: immersing a membrane-containing polyurethane foam body in a solution causing reticulation reaction and held at below 50° C., said solution comprising an alkali metal hydroxide, water, a water-soluble glycol, and an aliphatic alcohol of from 3 to 10 carbon atoms, said foam residing in said solution until reticulation has been effected, separating said reticulated structure from said solution and arresting the reticulating reaction.

3. In the alkali-catalyzed hydrolytic method for reticulating polyurethane foam to obtain a 3-dimensional reticulated structure consisting of spaced apart nexus and strands joined to said nexus and substantially free from membranous matter, the improvement comprising: submerging a membrane-containing polyurethane foam body in a solution held at below 50° C., said solution comprising sodium hydroxide, water, a water-soluble alkylene glycol of from 2 to 3 carbon atoms, and a water-soluble lower alcohol of from 3 to 7 carbon atoms, said foam residing in said solution until reticulation has been effected, separating said reticulated structure from said solution and arresting the reticulating reaction.

4. The process according to claim 3 wherein the glycol is ethylene glycol and the alcohol is isopropyl alcohol.

5. A process according to claim 3 wherein the glycol is propylene glycol.

6. A process according to claim 3 wherein the sodium hydroxide is 10 parts per 100 parts of the solution.

7. The process according to claim 1 wherein the polyurethane foam is a polyester polyurethane foam.

8. In the alkali-catalyzed hydrolytic method for reticulating polyurethane foam to obtain a 3-dimensional reticulated structure consisting of spaced apart nexus and strands joined to said nexus and substantially free from membranous matter, the improvement comprising: submerging a membrane-containing polyurethane foam body in a solution of 10 parts of sodium hydroxide per 100 parts of water, isopropyl alcohol and ethylene glycol solution, the proportions of components in the solution falling within the area A', C', B', A of FIGURE 1, said foam residing in said solution until reticulation has been effected, separating said reticulated structure from said solution and arresting the reticulating reaction.

9. In the alkali-catalyzed hydrolyic method for reticulating polyurethane foam to obtain a 3-dimensional reticulated structure consisting of spaced-apart nexus and strands joined to said nexus and substantially free from membranous matter, the improvement comprising: immersing a membrane-containing polyurethane foam body in a solution of 20 parts of sodium hydroxide per 100 parts of water, isopropyl alcohol and propylene glycol solution, the proportions of the components in the solution falling within the area A', C', B' of FIGURE 2, said foam residing in said solution until reticulation has been effected, separating said reticulated structure from said solution and arresting the reticulating reaction.

10. The process of claim 9 wherein the polyurethane is polyester polyurethane.

References Cited

UNITED STATES PATENTS

| | | | |
|---|---|---|---|
| 3,125,541 | 3/1964 | Hwa et al. | 260—2.5 |
| 3,125,542 | 3/1964 | Haines | 260—2.5 |
| 3,171,820 | 3/1965 | Volz | 260—2.5 |
| 3,322,701 | 5/1967 | Bauer et al. | 260—2.5 |

DONALD E. CZAJA, *Primary Examiner.*

M. J. WELSH, *Assistant Examiner.*